(12) United States Patent
Nakamura et al.

(10) Patent No.: US 8,823,779 B2
(45) Date of Patent: Sep. 2, 2014

(54) INFORMATION PROCESSING APPARATUS AND CONTROL METHOD THEREOF

(75) Inventors: Naohito Nakamura, Tokyo (JP); Kenji Morita, Yokohama (JP); Daisuke Kotake, Yokohama (JP); Kazuki Takemoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 728 days.

(21) Appl. No.: 12/763,672

(22) Filed: Apr. 20, 2010

(65) Prior Publication Data

US 2010/0277572 A1 Nov. 4, 2010

(30) Foreign Application Priority Data

Apr. 30, 2009 (JP) ................................. 2009-111497
Apr. 12, 2010 (JP) ................................. 2010-091828

(51) Int. Cl.
*H04N 13/02* (2006.01)

(52) U.S. Cl.
USPC ............................................ 348/50; 348/169

(58) Field of Classification Search
CPC .......................... G06T 7/0046; H04N 13/0221
USPC ........................ 348/50, 169, 187, 53; 382/103
See application file for complete search history.

(56) References Cited

U.S. PATENT DOCUMENTS

| | | | |
|---|---|---|---|
| 6,571,024 B1 * | 5/2003 | Sawhney et al. | 382/294 |
| 6,993,450 B2 | 1/2006 | Takemoto et al. | |
| 7,064,776 B2 * | 6/2006 | Sumi et al. | 348/169 |
| 7,519,218 B2 | 4/2009 | Takemoto et al. | |
| 8,315,432 B2 * | 11/2012 | Lefevre et al. | 382/103 |
| 2006/0227211 A1 | 10/2006 | Kotake et al. | |
| 2006/0244820 A1 | 11/2006 | Morita et al. | |
| 2007/0242899 A1 | 10/2007 | Satoh et al. | |
| 2009/0022365 A1 * | 1/2009 | Kotake | 382/103 |

(Continued)

FOREIGN PATENT DOCUMENTS

| | | |
|---|---|---|
| JP | 2002-334338 A | 11/2002 |
| JP | 2004-108836 A | 4/2004 |
| JP | 2006-292417 A | 10/2006 |
| JP | 2008-299784 A | 12/2008 |

OTHER PUBLICATIONS

T. Drummond et al., "Real-time visual tracking of complex structures," IEEE Transactions on Pattern Analysis and Machine Intelligence, vol. 24, No. 7, pp. 932-946 (Jul. 2002).

(Continued)

*Primary Examiner* — William C Vaughn, Jr.
*Assistant Examiner* — Naod Belai
(74) *Attorney, Agent, or Firm* — Fitzpatrick, Cella, Harper & Scinto

(57) ABSTRACT

A technique for reducing the time required before a tracking process is performed again in calculating the position and orientation of an image capturing apparatus or an object. Images captured by the apparatus are acquired, the acquired images are stored in order per frame, straight lines detected in the captured images and straight lines in a three-dimensional space model are matched, the position and orientation of the apparatus are initialized by obtaining correspondences having the highest consistency, a captured image to be processed is selected from the captured images, the change in position and orientation of the apparatus is measured using the change in position and orientation of a target object in the selected image based on the initialized position and orientation of the apparatus, and if the measured change in position and orientation is not within a predetermined threshold, initialization is performed using the selected image.

10 Claims, 10 Drawing Sheets

(56) References Cited

U.S. PATENT DOCUMENTS

| | | |
|---|---|---|
| 2009/0195557 A1 | 8/2009 | Nakamura et al. |
| 2009/0262113 A1 | 10/2009 | Kotake et al. |
| 2010/0045701 A1* | 2/2010 | Scott et al. .................. 345/633 |
| 2010/0142826 A1 | 6/2010 | Kotake et al. |
| 2011/0228103 A1* | 9/2011 | Takemoto et al. ............ 348/187 |

OTHER PUBLICATIONS

Y. Liu et al., "Determination of Camera Location from 2-D to 3-D Line and Point Correspondences", IEEE Transactions on Pattern Analysis and Machine Intelligence, vol. 12, No. 1, pp. 28-37 (Jan. 1990).

I. Skrypnyk et al., "Scene Modelling, Recognition and Tracking with Invariant Image Features", Proceedings of the Third IEEE and ACM International Symposium on Mixed Augmented Reality, pp. 110-119, (ISMAR 2004).

E. Rosten et al., "Fusing Points and Lines for High Performance Tracking", 10th IEEE International Conference of Computer Vision, vol. 2, pp. 1508-1515 (2005).

* cited by examiner 3a  3b

INFORMATION PROCESSING APPARATUS AND CONTROL METHOD THEREOF

BACKGROUND OF THE INVENTION

1. Field of the Invention

The present invention relates to an information processing apparatus and a control method thereof, and more particularly to measuring the position and orientation of an image capturing apparatus and an object using images.

2. Description of the Related Art

In recent years, much research has been carried out into augmented reality (hereinafter, AR) technology for displaying information in virtual space superimposed on real space. A video see-through head mounted display (hereinafter, HMD) is a typical example of an information presentation apparatuses for use with AR technology. A camera for capturing real space is built into the video see-through HMD, and the HMD draws a virtual object using computer graphics, according to the position and orientation of the camera in real space. A composite image obtained by further superimposing the drawn virtual object on the image in real space is displayed on an HMD display device such as a liquid crystal panel. This information presentation apparatus allows the user to experience a virtual object as though it exists in real space.

"Alignment" is one of the major problems that must be solved in realizing AR technology. Alignment in AR involves achieving geometric consistency between a virtual object and real space. In order for the user to experience a virtual object as though it exists in real space, geometric alignment needs to be performed correctly. In other words, the virtual object must be presented to the user as always existing where it would be in real space. In the case of using a video see-through HMD, this alignment involves measuring the position and orientation of the camera built into the HMD in a coordinate system set in the real space. The position and orientation of the camera can be measured using a physical sensor for measuring camera position and orientation with six degrees of freedom such as a magnetic sensor or an ultrasonic sensor, for example.

Incidentally, if a video see-through HMD is used, image information from the camera built into the HMD can be used to measure camera position and orientation. Such a measurement method using image information is widely used because of the simplicity and low cost with which measurement can be performed compared with a method using physical sensors.

A Non-Patent Document 1 discloses a method of measuring camera position and orientation using a three-dimensional geometric model describing real space and physical objects by line segments, and edge information on images captured by the camera. Here, an "edge" denotes a point on an image where the density rapidly changes. With this method, camera position and orientation are calculated by positioning the numerous edges detected in an image so as to correspond to the line segments of a three-dimensional geometric model projected onto the image based on the position and orientation of the camera. More specifically, the line segments of the three-dimensional geometric model are virtually projected onto the image based on predicted values of the camera position and orientation input in advance, and edge detection is performed in proximity to the projected line segments. Camera position and orientation are then calculated by repeatedly correcting the predicted values of camera position and orientation, so that the detected edges lie on the projected line segments.

With the aforementioned method of measuring camera position and orientation using edges, the position and orientation of the camera in the previous frame are primarily used as the predicted values of camera position and orientation. Thus, if measurement of position and orientation in a given frame fails, measurement of position and orientation in the following frame cannot be performed. Measurement failure occurs if the camera is moved quickly, for example. In such a case, measurement of position and orientation tends to fail because of edges not being detected due to motion blur occurring in the image, or edges no longer being in proximity to the line segments projected based on the predicted values of camera position and orientation. Also, with the initial frame, the camera position and orientation in a previous frame cannot be obtained.

Thus, in order to actually use the method of measuring camera position and orientation using edges, an initialization process for measuring camera position and orientation without using predicted values of camera position and orientation is required for the initial frame and for the frame immediately following measurement failure.

One such measure involves firstly setting a predetermined default position and default orientation, and moving the camera so as to be in the default position and default orientation, and then performing initialization of camera position and orientation using edges, with the default position and default orientation as predicted values.

Another measure involves measuring the camera position and orientation from features detected in an image, without using predicted values of the camera position and orientation. For example, a Non-Patent Document 2 discloses a method of measuring camera position and orientation based on correspondences between straight lines detected in an image and straight lines corresponding thereto in three-dimensional space. With this method, camera position and orientation are calculated by solving linear equations based on eight or more line correspondences. With the method of Non-Patent Document 2, the method of matching straight lines detected in an image and straight lines corresponding thereto in three-dimensional space is not indicated. Thus, in order to measure camera position and orientation using the method disclosed in Non-Patent Document 2 from a state of not knowing the method of matching straight lines in an image and straight lines in three-dimensional space, it is necessary to derive correspondences between the straight lines detected in the image and the straight lines in three-dimensional space using some sort of measure. Generally, camera position and orientation are calculated by randomly matching straight lines in an image and straight lines in three-dimensional space, and the result calculated when using correspondences having the highest consistency is output as the final camera position and orientation.

Also, with a Patent Document 1, stable position and orientation measurement is performed, by mounting an inclination sensor to the camera, and measuring camera position and orientation using a combination of values measured by the inclination sensor and image information (point information). Also, with a Patent Document 2, the azimuth angle of the camera is calculated, by mounting an inclination sensor to the camera, and using values measured by the inclination sensor and information on straight lines in the image.

Since the aforementioned initialization process generally requires time, the camera position and orientation in an image used in the initialization process may, in the case where the camera is constantly moving, for example, differ greatly from the actual position and orientation of the camera at the point in time at which the initialization process ends. In such a case, position and orientation measurement will likely fail, given that edges no longer exist in proximity to the line segments projected based on the values of the camera position and orientation after the initialization process has ended. In a Patent Document 3, tracking of position and orientation information on the camera or an object is enabled by holding the image data of frames captured by the camera, and sequentially performing processing, from the image of the next frame after the image used in the initialization process until the current image.

RELATED ART DOCUMENTS

Patent Documents

Patent Document 1: Japanese Patent Laid-Open No. 2006-292417
Patent Document 2: Japanese Patent Laid-Open No. 2004-108836
Patent Document 3: Japanese Patent Laid-Open No. 2002-334338

Non-Patent Documents

Non-Patent Document 1: T. Drummond and R. Cipolla, "Real-time visual tracking of complex structures," IEEE Transactions on Pattern Analysis and Machine Intelligence, vol. 24, No. 7, pp. 932-946, 2002.
Non-Patent Document 2: Y. Liu, T. S. Huang, and O. D. Faugeras, "Determination of camera location from 2-D to 3-D line and point correspondences," IEEE Transactions on Pattern Analysis and Machine Intelligence, vol. 12, No. 1, pp. 28-37, 1990.
Non-Patent Document 3: I. Gordon and D. G. Lowe: "Scene Modeling, Recognition and Tracking with Invariant Image Features" Proc. Int. Symp. on Mixed and Augmented Reality, pp. 110-119, 2004.
Non-Patent Document 4: E. Rosten, T. Drummond, "Fusing points and lines for high performance tracking,"In: 10th IEEE International Conference on Computer Vision. Vol. 2, pp. 1508-1515, 2005.

However, with the method of Patent Document 3, all of the images, from the image used in the initialization process until the current image, sequentially undergo the tracking process. Consequently, in the case where much time is needed for the initialization process, a great deal of time will be needed before the tracking process is performed on the current image. Also, with this method, when there is a quick movement of the camera or the target object that is likely to cause tracking process failure, the initialization process and the tracking process need to be performed again, after having performed the initialization process and the tracking process up to the frame in which the tracking process failed. In this case, there is a problem in that a significant amount of time is required before performing the tracking process again.

The present invention provides a technique for solving the problem in the conventional technology of the long processing time before the tracking process is performed again following tracking process failure.

SUMMARY OF THE INVENTION

To achieve the above object, an information processing apparatus of the present invention is provided with an input unit for acquiring a plurality of frame images from an image capturing apparatus for capturing a target object, storage unit for storing the plurality of frame images acquired by the input unit, an initialization unit for selecting a single frame image designated in advance from the plurality of stored frame images, for matching edges detected in the designated frame image and a shape of a three-dimensional geometric model of the target object, and for deriving a value of a position and orientation of the image capturing apparatus, a measurement unit for sequentially selecting frame images that follow the designated frame image from the plurality of frame images, for using a position and orientation value determined using a frame image precedent to the selected frame image to match the three-dimensional geometric model of the target object to edges of the target object in the currently selected frame image, and for measuring the position and orientation of the image capturing apparatus, a determination unit for determining whether a value of the position and orientation of the image capturing apparatus measured by the measurement unit is within a prescribed range, and a control unit for controlling the initialization unit to perform initialization using the currently selected frame image, in a case where the determination unit determines that the value of the position and orientation of the image capturing apparatus is not within the prescribed range.

According to the present invention, the processing time before the tracking process is performed again can be shortened.

Further features of the present invention will become apparent from the following description of exemplary embodiments with reference to the attached drawings.

DESCRIPTION OF THE EMBODIMENTS

Hereinafter, the present invention will be described in detail in accordance with preferred embodiments thereof, with reference to the accompanying drawings.

Embodiment 1
Configuration

Figure 1:
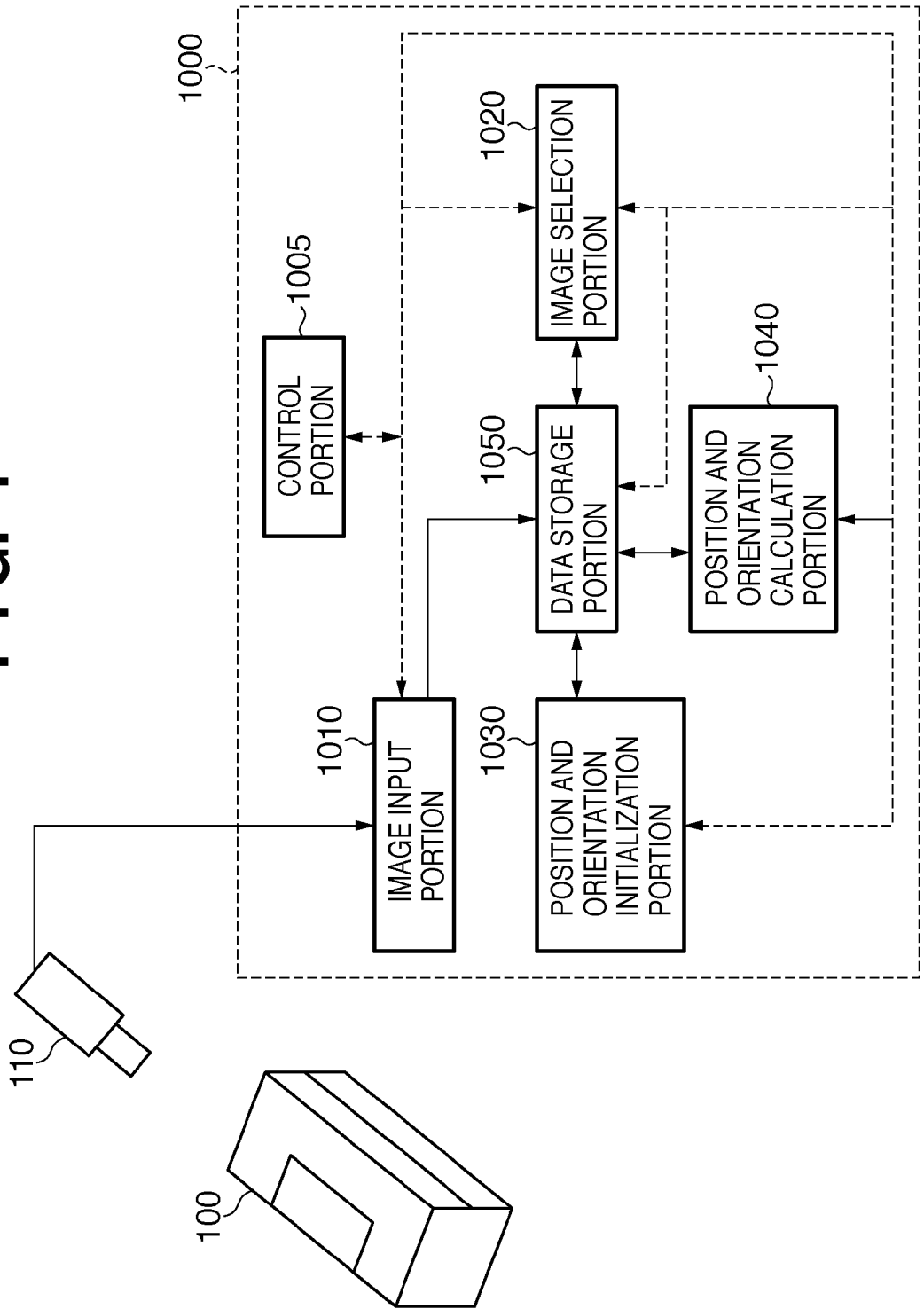
FIG. 1 is a block diagram showing an example configuration of a position and orientation measurement unit according to an Embodiment 1.

FIG. 1 is a block diagram showing the configuration of a position and orientation measurement unit serving as an information processing apparatus according to an Embodiment 1. As shown in FIG. 1, a position and orientation measurement unit 1000 according to the present embodiment is provided with an image input portion 1010, an image selection portion 1020, a position and orientation initialization portion 1030, a position and orientation calculation portion 1040, and a data storage portion 1050. Also, the position and orientation measurement unit 1000 has a control portion 1005 that performs overall control of these constituent elements.

The image input portion 1010 is connected to an image capturing apparatus 110. The image capturing apparatus 110 captures an observation target object 100. The position and orientation measurement unit 1000 measures the position and orientation of the image capturing apparatus 110 in a coordinate system defined in three-dimensional space that includes the observation target object 100. Note that the observation target object is assumed to be fixed in real space. Hereinafter, the elements constituting the position and orientation measurement unit 1000 will be described.

The image input portion 1010 acquires a plurality of consecutive frame images captured by the image capturing apparatus 110, and stores the acquired frame images in order in the data storage portion 1050. The image input portion 1010 is realized by an analog video capture board if the output of the image capturing apparatus is analog output such as NTSC signals. Also, the image input portion 1010 is realized by an IEEE 1394 interface board, if the output of the image capturing apparatus is digital output such as IEEE 1394 output, for example. Also, the digital data of still images or moving images stored in a storage device in advance may be read out.

The image selection portion 1020 selects a single frame image designated in advance for the position and orientation initialization portion 1030, and sequentially selects frame images that are ahead of the designated image for the position and orientation calculation portion 1040, from images acquired by the image input portion 1010 that are stored in the data storage portion 1050.

The position and orientation initialization portion 1030 derives the position and orientation of the image capturing apparatus using the single image selected by the image selection portion 1020. For example, the position and orientation initialization portion 1030 calculates the position and orientation of the image capturing apparatus from correspondences between straight lines detected in the image and straight lines corresponding thereto in three-dimensional space as disclosed in Non-Patent Document 2, and stores the calculated position and orientation in the data storage portion 1050.

The position and orientation calculation portion 1040 measures the position and orientation of the image capturing apparatus using edges as disclosed in Non-Patent Document 1, for example, using the images selected by the image selection portion 1020.

The data storage portion 1050 is, as abovementioned, for storing various types of information, and is constituted by a RAM, a hard disk drive or the like. Also, the data storage portion 1050 stores three-dimensional geometric model data of the observation target object 100. Also, the data storage portion 1050 holds a flag F indicating whether measurement of the position and orientation of the image capturing apparatus was successful or failed. The flag F in a default state is held as indicating failed because there are no predicted values of the position and orientation measurement. Note that apart from the information described above as being stored in the data storage portion 1050, it is assumed that information described in the present embodiment as known information is also stored in the data storage portion 1050.

Flowchart

Figure 2:
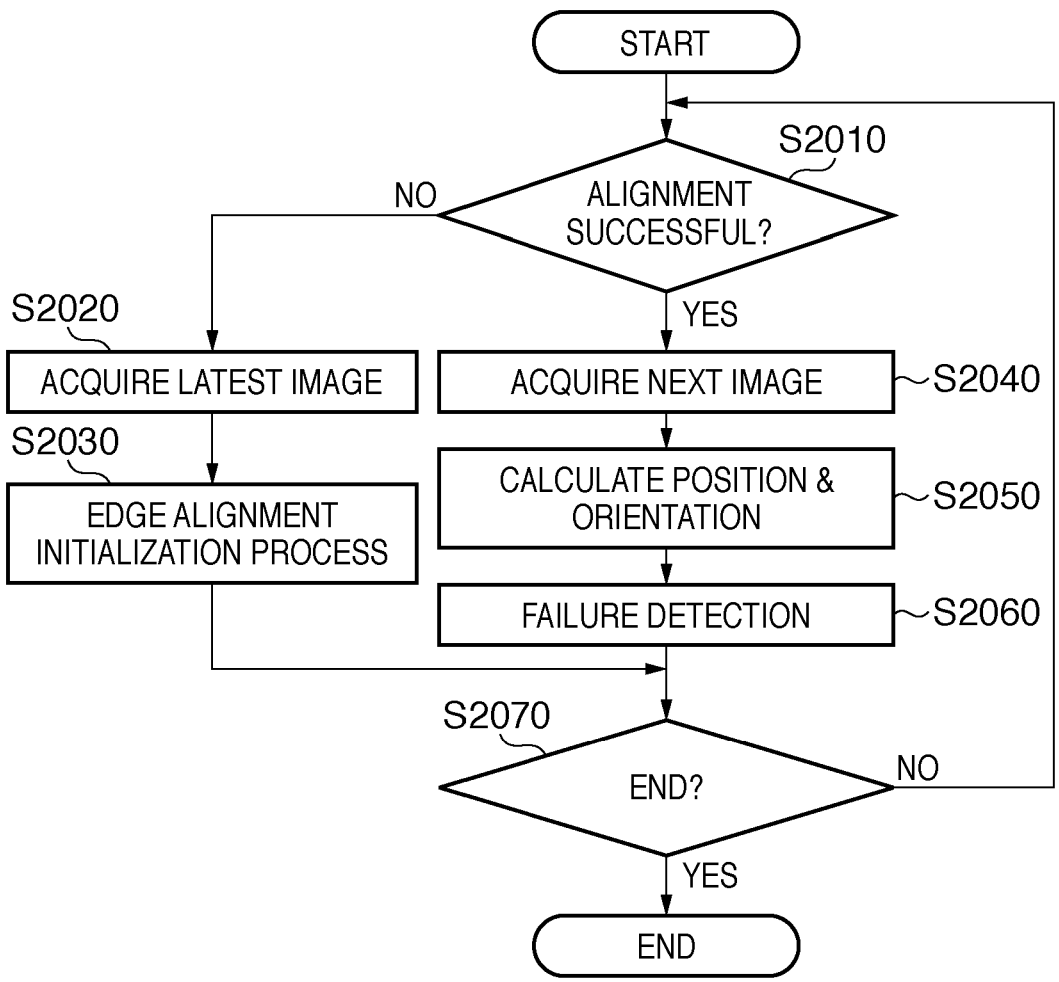
FIG. 2 is a flowchart showing the processing procedure of a position and orientation measurement method in Embodiment 1.

Next, the processing procedure of the position and orientation measurement method in Embodiment 1 will be described. FIG. 2 is a flowchart showing the processing procedure of the position and orientation measurement method in the present embodiment.

Firstly, in step S2010, the control portion 1005 determines whether the current state of the position and orientation measurement is successful or failed, by looking at the value of the flag F stored in the data storage portion. If the flag F indicates failed, the processing advances to step S2020, and if the flag F indicates successful, the processing advances to step S2040.

In step S2020, the image selection portion 1020 selects an image to be subsequently processed from the images stored in the data storage portion 1050. This means the latest image currently selected.

In step S2030, the position and orientation initialization portion 1030 performs the process of initializing the position and orientation of the image capturing apparatus 110. If the initialization process was successful, the flag F is set to indicate successful, and if the initialization process failed, the flag F is set to indicate failed. The set value of the flag F is then stored in the data storage portion 1050, and the processing advances to step S2070. Note that because techniques for initializing the position and orientation of the image capturing apparatus are well-known techniques such as disclosed in Non-Patent Document 2, for example, a detailed description thereof will be omitted.

In step S2040, the image selection portion 1020 selects the next image to be processed. This next image, which will be used by the position and orientation calculation portion 1040, is selected from images captured by the image capturing apparatus that are stored in the data storage portion 1050.

Here, the method of selecting this image in the image selection portion 1020 will be described. In Patent Document 3, it took a long time to perform a tracking process for the latest image because all the process from the image of the initialization to the latest image is sequentially performed. However, in the tracking process of this embodiment, all the process from the image of the initialization to the latest image is not performed but is performed except images having frame numbers less than a constant frame number. Therefore, the tracking process can be performed in shorter time from the image of the initialization than before. The image in the ith frame captured by the image capturing apparatus that is stored in the data storage portion 1050 is set as $P_i$ ($i=1, 2, \ldots, N$). Here, PN indicates the latest image to undergo image processing. The image selection portion 1020 assumes that the images up to the kth frame have been used to calculate the position and orientation of the image capturing apparatus. At this time, the image selection portion 1020 selects an image $P_{k+\alpha}$ of the $(k+\alpha)$th frame that is separated from (temporally comes after) the processed kth frame by $\alpha$. The value of $\alpha$ is given by an operator performing an interactive setting operation. Alternatively, the value of $\alpha$ may be dynamically set depending on the preset frame rate at which the image capturing apparatus captures images and the time required to process step S2050.

Figure 3:
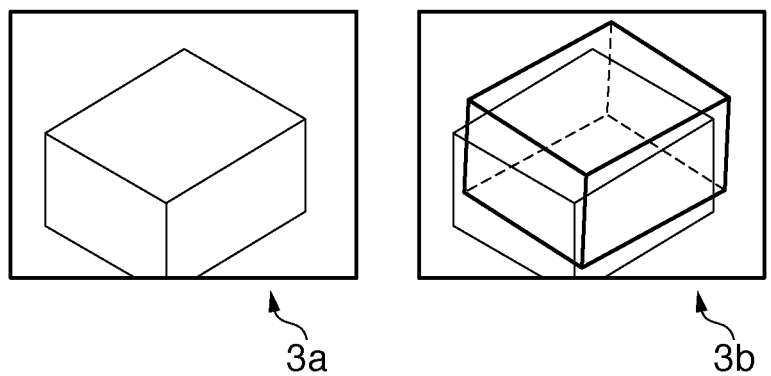
FIG. 3 illustrates the projection of a three-dimensional model onto an image.

In step S2050, the position and orientation calculation portion 1040 calculates the position and orientation of the image capturing apparatus 110, using the image $P_{k+\alpha}$ selected in step S2040. This measurement may be performed with the method of calculating position and orientation using edges disclosed in Non-Patent Document 1, for example. FIG. 3 illustrates the projection of a three-dimensional geometric model onto a captured image. The process of calculating the position and orientation of the image capturing apparatus 110 at step S2050 will be described using this figure.

(1) Line segments of a three-dimensional geometric model are projected onto the image, based on predicted values of the position and orientation of the image capturing apparatus and fixed parameters of the image capturing apparatus that have been calibrated in advance. Here, 3a of FIG. 3 shows the shape of the target object of an image captured by the image capturing apparatus, and 3b of FIG. 3 shows an image obtained by projecting line segments representing the shape of a three-dimensional geometric model onto the image captured by the image capturing apparatus. Here, the three-dimensional geometric model is represented by bold solid lines and dotted lines, with the dotted lines indicating hidden portions of the three-dimensional geometric model. This three-dimensional geometric model is projected based on predicted values of the position and orientation of the image capturing apparatus determined with the frame before the frame shown in 3a of FIG. 3.

(2) The projected line segments are divided at regular intervals on the image, and division points are set. An edge search is performed on line segments (search lines) that pass through the division points and are oriented in the direction of the normal of the projected line segments, and a point, closest to a division point, at which the gradient of luminance values on the search line is maximized is detected as a matching edge.

(3) Correction values for the position and orientation of the image capturing apparatus that minimize the sum of the distances on the image between the matching edge detected for each division point and the projected line segments is calculated, and the position and orientation of the image capturing apparatus is corrected.

(4) Optimization calculation is repeatedly performed until the processing of (3) is refined. When step S2050 ends, the processing advances to step S2060.

In step S2060, the control portion 1005 performs failure detection. Here, the control portion 1005 detects whether the position and orientation measurement has failed. Failure detection is performed based on the line segments projected onto the image based on the calculated position and orientation, and the distances to the edges detected at step S2050, for example. Specifically, the control portion 1005 determines that measurement has failed if the proportion of edges for which the distance between a line segment and the detected edge corresponding thereto exceeding a preset threshold value is greater than a threshold value. If failure is detected in step S2060, the control portion 1005 sets the flag F to indicate failed, and stores the set value of the flag F in the data storage portion 1050. When step S2060 ends, the processing advances to step S2070.

At step S2070, the control portion 1005 determines whether to end the position and orientation measurement. In the case of not ending the position and orientation measurement, the processing returns to step S2010.

As described above, in the present embodiment, even if image processing failure is detected, all the process from the image of the initialization to the latest image is not performed, but the process is performed except images having frame numbers less than a predetermined frame number $\alpha$. Therefore, the tracking process to be performed in a shorter time than before.

Embodiment 2

In Embodiment 2, the tracking process is performed using an image Pk+j (j=1, 2, ..., $\alpha$−1) of the (k+j)th frame between an image Pk of the kth frame and an image Pk+$\alpha$ of the k+$\alpha$th frame, rather than performing the initialization process again as in Embodiment 1. By performing the tracking process using this image Pk+j, it can be expected that the process of measuring the position and orientation of the image capturing apparatus will be successful, and that the processing time will be less than the time spent on the initialization process performed in Embodiment 1. Hereinafter, the processing procedure of the position and orientation measurement method according to the present embodiment will be described.

Flowchart

Figure 4:
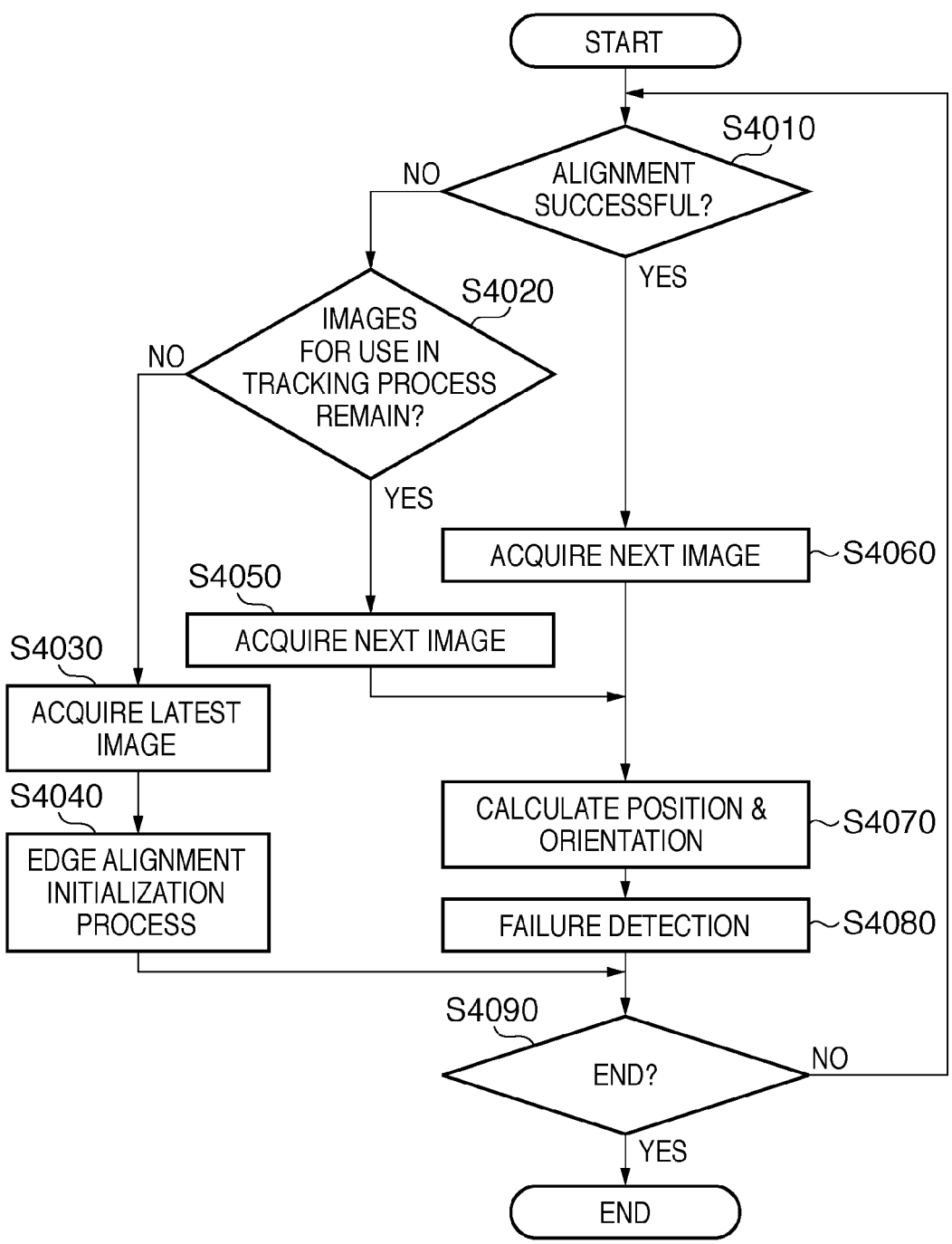
FIG. 4 is a flowchart showing the processing procedure of a position and orientation measurement method in an Embodiment 2.

FIG. 4 is a flowchart showing the processing procedure of the position and orientation measurement method in Embodiment 2. At step S4010, the control portion 1005 determines whether the current state of the position and orientation measurement is successful or failed, by looking at the value of the flag F stored in the data storage portion 1050. If the flag F indicates failed, the processing advances to step S4020, and if the flag F indicates successful, the processing advances to step S4060.

In step S4020, the control portion 1005 determines whether there remain images for use in the tracking process (frame image between k and k+$\alpha$), by looking at the value of $\alpha$ stored in the data storage portion 1050 in advance. If $\alpha \geq 2$, the processing advances to S4050, and if $\alpha$<2, the processing advances to S4030.

In S4030, because there remains only one image for use in the tracking process, the image selection portion 1020 selects the latest image as the image to be processed. Next, in step S4040, the position and orientation initialization portion 1030 performs the process of initializing the position and orientation of the image capturing apparatus 110. After the initialization process has ended, the value of $\alpha$ is set to 0. If the initialization process was successful, the flag F is set to indicate successful, and if the initialization process failed, the flag F is set to indicate failed. The set value of the flag F is then stored in the data storage portion 1050, and the processing advances to step S4090.

In step S4050, because there remain images for use in the tracking process, the image selection portion 1020 selects an image Pk+j (j=1, 2, ..., $\alpha$−1) between the images Pk and Pk+$\alpha$, and sets $\alpha$=j. That is, the image selection portion 1020 selects an image every jth frame counting from the kth frame. The value of j may be given by an operator performing an interactive setting operation, or may be dynamically set depending on the frame rate at which the image capturing apparatus captures images. When step S4050 ends, the processing is advanced to step S4070.

In step S4060, the image selection portion 1020 selects the image Pk+$\alpha$ to be used by the position and orientation calculation portion 1040. This image is selected from images captured by the image capturing apparatus and acquired by the image input portion 1010 that are stored in the data storage portion 1050. When step S4060 ends, the processing is advanced to step S4070.

In step S4070, the position and orientation calculation portion 1040 remeasures the position and orientation of the image capturing apparatus 110 with a well-known method of calculating position and orientation using edges such as disclosed in Non-Patent Document 1, for example, using the image Pk+$\alpha$ selected at step S4050 or step S4060. When step S4070 ends, the processing advances to step S4080, and failure detection is performed.

At step S4080, the control portion 1005 detects whether the position and orientation measurement has failed. Failure detection is performed based on the line segments projected onto the image based on the calculated position and orientation, and the distances to the edges detected at step S4070, for example. Specifically, the control portion 1005 determines that measurement has failed if the proportion of edges for which the distance between a line and the detected edge corresponding thereto exceeding a preset threshold value is greater than a threshold value. If failure is detected in step S4080, the control portion 1005 sets the flag F to indicate failed, and stores the set value of the flag F in the data storage portion 1050. When step S4080 ends, the processing advances to step S4090.

At step S4090, the control portion 1005 determines whether to end the position and orientation measurement, by confirming whether image data remains in the data storage portion 1050. In the case of not ending the position and orientation measurement, the processing returns to step S4010.

As described above, in Embodiment 2, after measurement has failed, the process of measuring the position and orientation of the image capturing apparatus is performed using the captured image of a frame that temporally comes before the image Pk+α, and provided that this measurement process does not fail, the measurement process can be advanced more quickly than performing the initialization process again as in Embodiment 1.

Embodiment 3

A position and orientation measurement unit according to the present embodiment is constituted by mounting an orientation sensor with three degrees of freedom to the position and orientation measurement unit of Embodiment 1. Embodiment 3 is characterized by using orientation measurement values output from the orientation sensor. Hereinafter, the position and orientation measurement unit and the position and orientation measurement method according to the present embodiment will be described.

Configuration

Figure 5:
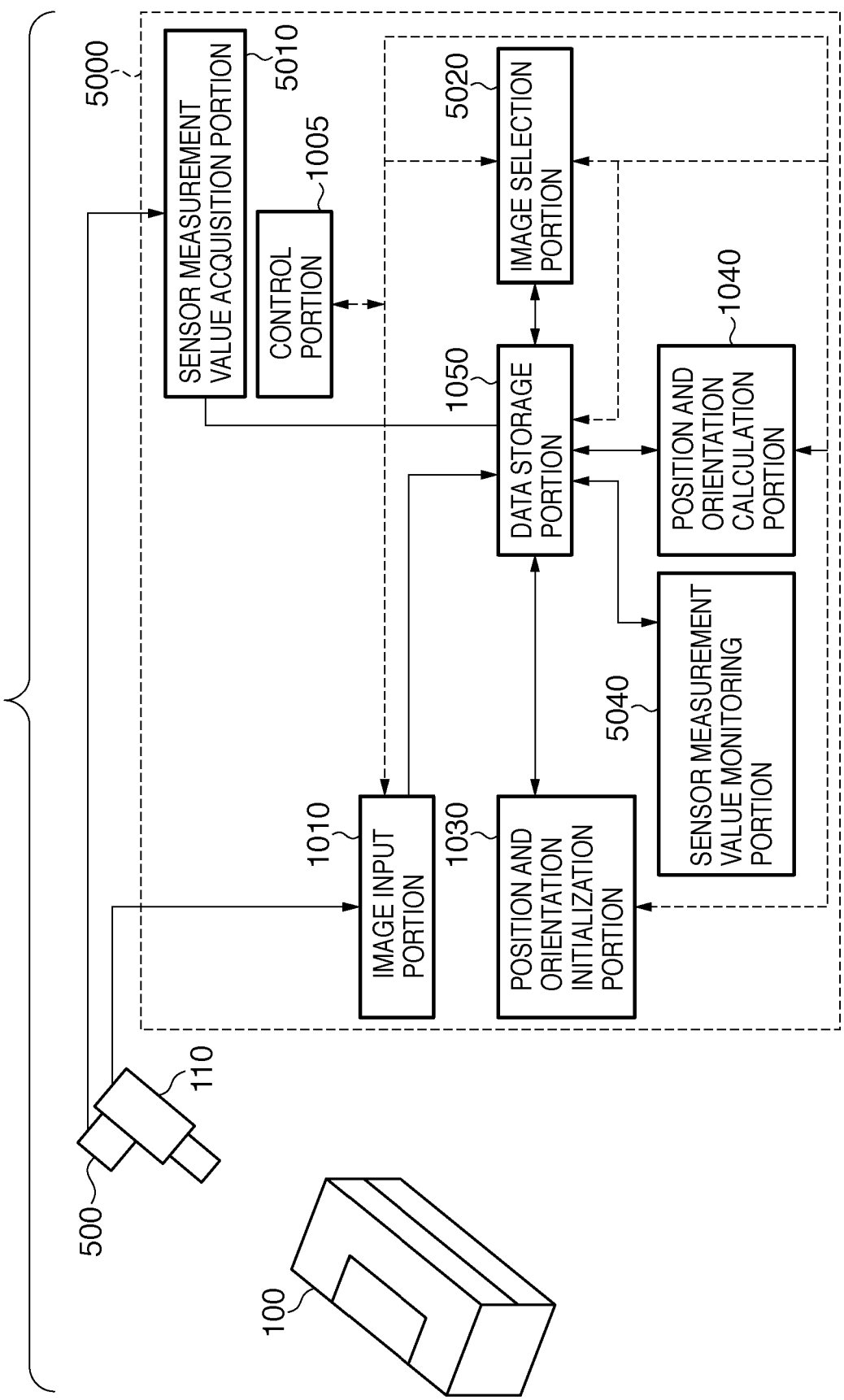
FIG. 5 is a block diagram showing an example configuration of a position and orientation measurement unit in an Embodiment 3.

FIG. 5 is a block diagram showing the configuration of the position and orientation measurement unit according to Embodiment 3. Note that in FIG. 5, the same numbers are attached to the same constituent elements as FIG. 1. Consequently, description thereof will be omitted. As shown in FIG. 5, a position and orientation measurement unit 5000 according to the present embodiment is provided with an image input portion 1010, a position and orientation calculation portion 1040, a data storage portion 1050, a sensor measurement value acquisition portion 5010, an image selection portion 5020, a position and orientation initialization portion 1030, and a sensor measurement value monitoring portion 5040. Also, the position and orientation measurement unit 5000 has a control portion 1005 that performs overall control of these constituent elements.

An orientation sensor 500 measures its own orientation in a sensor coordinate system. The orientation sensor 500 incorporates an inclinometer (now shown) capable of measuring the direction of the earth's gravity, with one axis of the sensor coordinate system set in the opposite direction to gravity. The measurement values of orientation data with three degrees of freedom are output to the sensor measurement value acquisition portion 5010, in accordance with a request from the sensor measurement value acquisition portion 5010.

The sensor measurement value acquisition portion 5010, which serves as an orientation acquisition unit, outputs orientation measurement values input from the orientation sensor 500 to the data storage portion 1050. The image selection portion 5020 selects an image to be used by the position and orientation initialization portion 1030 or the position and orientation calculation portion 1040 from images acquired by the image input portion 1010 that are stored in the data storage portion 1050.

The position and orientation initialization portion 1030 performs measurement (initialization process) of the position and orientation of the image capturing apparatus using the image selected by the image selection portion 5020, without using predicted values of the position and orientation of the image capturing apparatus, and stores the measurement result in the data storage portion 1050. The initialization process may be performed with the method disclosed in Non-Patent Document 2, or may be performed with the method using the values measured by the orientation sensor 500 disclosed in Patent Document 1. The sensor measurement value monitoring portion 5040 monitors the orientation measurement values of the orientation sensor 500 acquired by the sensor measurement value acquisition portion 5010, and calculates the amount of change in the sensor measurement values.

Flowchart

Figure 6:
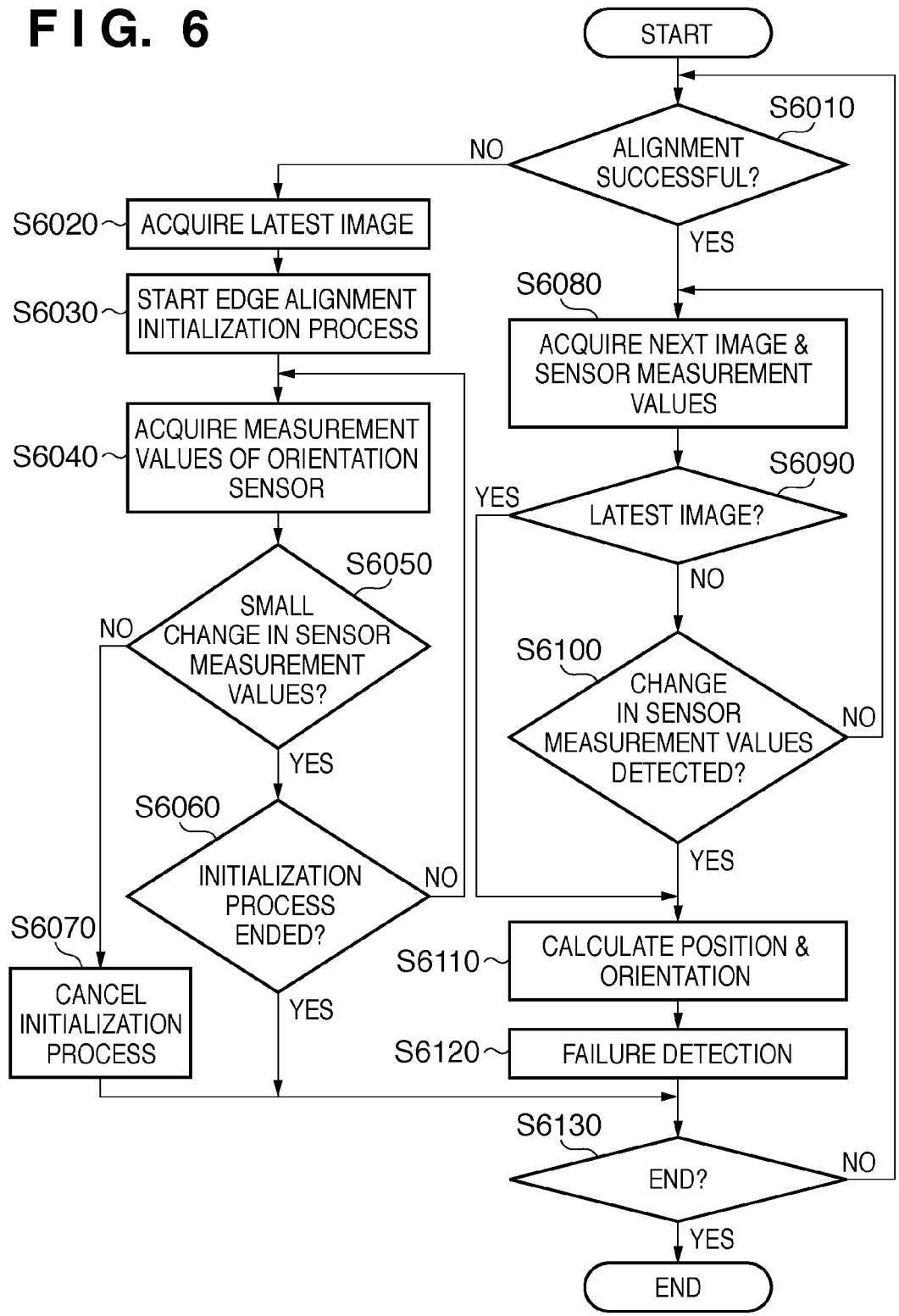
FIG. 6 is a flowchart showing the processing procedure of a position and orientation measurement method in Embodiment 3.

Next, the processing procedure of the position and orientation measurement method in Embodiment 3 will be described. FIG. 6 is a flowchart showing the processing procedure of the position and orientation measurement method in Embodiment 3.

Firstly, in step S6010, the control portion 1005 determines whether the current state of the position and orientation measurement is successful or failed, by looking at the value of the flag F stored in the data storage portion 1050. If the flag F indicates failed, the processing advances to step S6020, and if the flag F indicates successful, the processing advances to step S6080.

In step S6020, the image selection portion 5020 selects the latest image as the image to be processed. Next, in step S6030, the position and orientation initialization portion 1030 starts the process of initializing the position and orientation of the image capturing apparatus 110, and advances the processing to step S6040.

In step S6040, the sensor measurement value acquisition portion 5010 acquires the orientation measurement values of the orientation sensor 500, and stores the acquired values in the data storage portion 1050.

In step S6050, the sensor measurement value monitoring portion 5040 calculates the change in orientation of the orientation measurement values of the orientation sensor 500, and determines the magnitude of the change in orientation. Specifically, the sensor measurement value monitoring portion 5040 compares the orientation measurement values of the orientation sensor 500 acquired last time with the current orientation measurement values of the orientation sensor 500, calculates the difference, and determines the amount of change to be large if the amount of change is above a threshold value, and to be small if the amount of change is at or below the threshold value. If the amount of change in small, the processing advances to step S6060, and if the amount of change in large, the processing advances to step S6070.

In step S6060, the control portion 1005 determines whether the process of initializing the position and orientation of the image capturing apparatus 110 has ended. If the initialization process has ended, the control portion 1005 determines whether the initialization process was successful or not. If the initialization process was successful, the flag F is set to indicate successful, and if the initialization process failed, the flag F is set to indicate failed. The set value of the flag F is then stored in the data storage portion 1050, and the processing advances to step S6130. Also, if the initialization process has not ended, the processing returns to step S6040.

In step S6070, the position and orientation initialization portion 1030 cancels the initialization process, sets the flag F to indicate failed, and advances to step S6130.

In step S6080, the image selection portion 1020 selects the image Pk+1 of the next frame after the image Pk, when images up to kth frame have been used to calculate the position and orientation of the image capturing apparatus or to determine whether a change in sensor measurement values has been detected. Also, the sensor measurement value monitoring portion 5040 acquires the orientation measurement values of the orientation sensor 500 acquired between the image Pk and the image Pk+1.

At step S6090, the control portion 1005 determines whether the image Pk+1 selected in step S6080 is the latest image. If the image Pk+1 is the latest image, the processing advances to step S6110, and if the image Pk+1 is not the latest image, the processing advances to step S6100.

At step S6100, the sensor measurement value monitoring portion 5040 determines whether a change in sensor orientation values has been detected, using the orientation measurement values of the orientation sensor 500 acquired in step S6080. Specifically, the sensor measurement value monitoring portion 5040 calculates the maximum value of the amount of change between the orientation measurement values at the time of the image Pk and the orientation measurement values at the time of the image Pk+1, and, if the maximum value of the amount of change is above a threshold value, determines that a change in sensor measurement values has been detected. As for the threshold value, the maximum tolerance of the orientation sensor 500 may be used, or the change in orientation values permissible with the position and orientation calculation method used by the position and orientation calculation portion 1040, if known, may be used. If it is determined that a change in sensor measurement values has been detected, the processing advances to step S6110, and if it is determined that a change in sensor measurement values has not been detected, the processing returns to step S6080.

In step S6110, the position and orientation calculation portion 1040 calculates the position and orientation of the image capturing apparatus 110 with the position and orientation calculation method using edges disclosed in Non-Patent Document 1, using the image Pk+1.

When step S6110 ends, the processing advances to step 6120, and the control portion 1005 performs failure detection. Here, the control portion 1005 detects whether the position and orientation measurement has failed. If failure is detected in step S6120, the control portion 1005 sets the flag F to indicate failed. When step S6120 ends, the processing advances to step S6130. At step S6130, the control portion 1005 determines whether to end the position and orientation measurement. In the case of not ending the position and orientation measurement, the processing returns to step S6010.

In the embodiment described above, an orientation sensor is mounted to the image capturing apparatus, and orientation is measured. However, the sensor mounted to the image capturing apparatus is not limited to an orientation sensor, and a sensor which enable to measure a change in position and orientation can be applied. For example, mounting an accelerometer for three axis and an angular accelerometer to the image capturing apparatus, a change value of the position and orientation may be measured in the step S6050 by using variations of a position and an orientation acquired by integrating outputs from each of the sensors. At this time, the measurement values acquired by the sensor measurement value acquisition portion 5010 will be position and orientation measurement values measured in a predetermined period by each of the sensors. Also, the measurement values monitored by the sensor measurement value monitoring portion 5040 will be change values of position and orientation measurement measured by each of the sensors.

Embodiment 4

In Embodiment 3, the time required to cancel the initialization process of the image capturing apparatus or to calculate the position and orientation of the image capturing apparatus was reduced by using orientation measurement values output from an orientation sensor with three degrees of freedom mounted to the image capturing apparatus. However, optical flow may be calculated from images captured by the image capturing apparatus, without mounting a sensor to the image capturing apparatus. That is, movement of an object in a visual representation may be represented with vectors, and the time required to cancel the initialization process or to calculate of the position and orientation of the image capturing apparatus may be reduced by using the values of this object flow. Hereinafter, the position and orientation measurement unit and the position and orientation measurement method according to the present embodiment will be described.

Configuration

Figure 7:
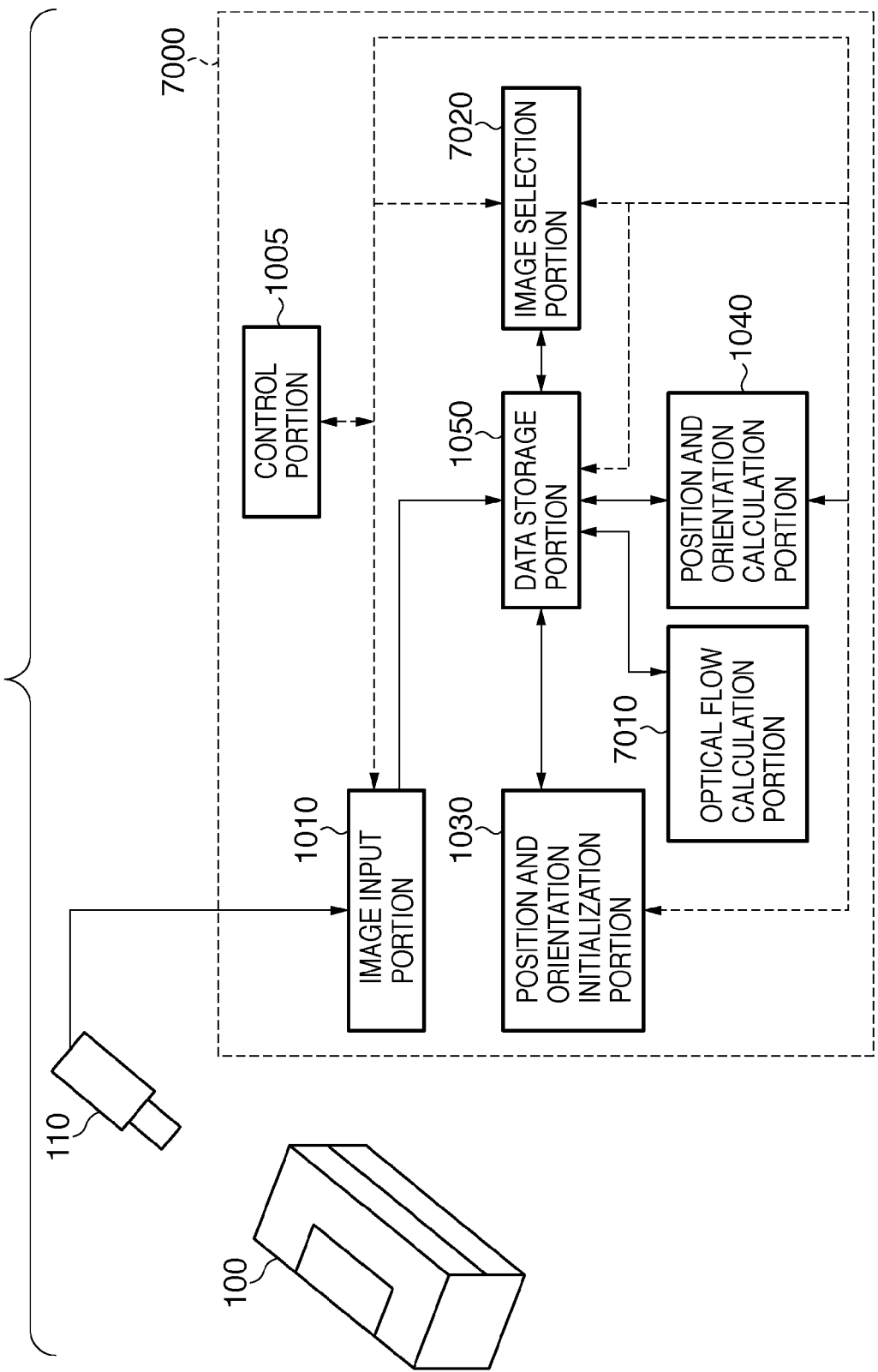
FIG. 7 is a block diagram showing an example configuration of a position and orientation measurement unit in an Embodiment 4.

FIG. 7 is a block diagram showing the configuration of the position and orientation measurement unit according to the present embodiment. Note that in FIG. 7, the same numbers are attached to constituent elements that are the same from FIGS. 1 through 5, and description thereof will be omitted. As shown in FIG. 7, a position and orientation measurement unit 7000 according to the present embodiment is constituted by an image input portion 1010, a position and orientation initialization portion 1030, a position and orientation calculation portion 1040, a data storage portion 1050, an optical flow calculation portion 7010, and an image selection portion 7020. Also, the position and orientation measurement unit 7000 has a control portion 1005 that performs overall control of these constituent elements.

The optical flow calculation portion 7010 calculates the optical flow using images captured by the image capturing apparatus 110, and calculates the amount of change.

The image selection portion 7020 selects an image to be used by the position and orientation initialization portion 1030 or the position and orientation calculation portion 1040 from images stored in the data storage portion 1050 that were acquired by the image input portion 1010.

Flowchart

Figure 8:
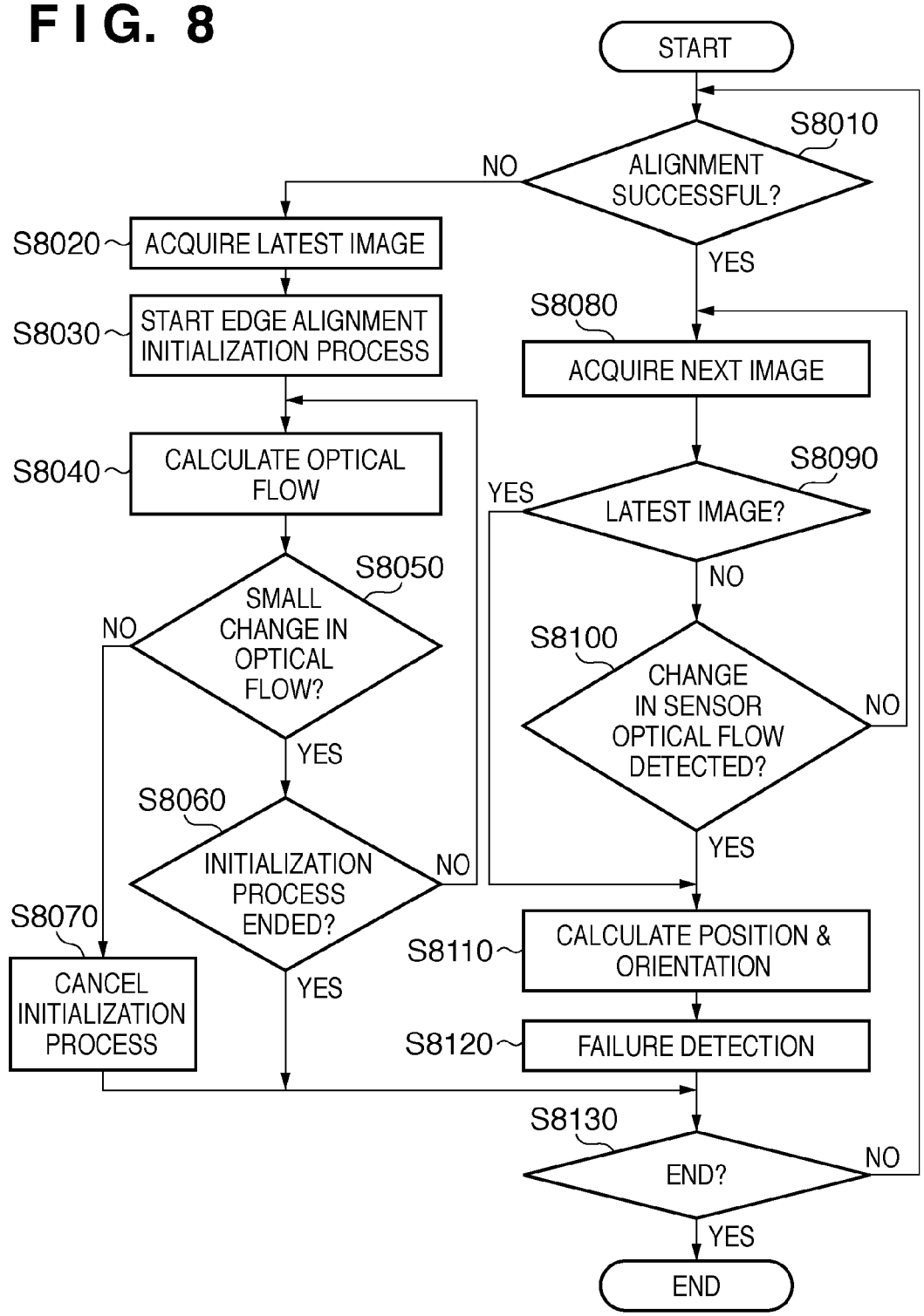
FIG. 8 is a flowchart showing the processing procedure of a position and orientation measurement method in Embodiment 4.

Next, the processing procedure of the position and orientation measurement method in Embodiment 4 will be described. FIG. 8 is a flowchart showing the processing procedure of the position and orientation measurement method in the present embodiment.

Firstly, in step S8010, the control portion 1005 determines whether the current state of the position and orientation measurement is successful or failed, by looking at the value of the flag F stored in the data storage portion 1050. If the flag F indicates failed, the processing advances to step S8020, and if the flag F indicates successful, the processing advances to step S8080.

In step S8020, the image selection portion 7020 selects the latest image PR as the image to be processed. Next, in step S8030, the position and orientation initialization portion 1030 starts the process of initializing the position and orientation of the image capturing apparatus 110, sets j=0, and advances the processing to step S8040.

In step S8040, image selection portion 7020 selects the image PR+j and the image PR+j+1. The optical flow calculation portion 7010 calculates the optical flow from the two images PR+j and PR+j+1, and advances the processing to step S8050.

In step S8050, the control portion 1005 determines the magnitude of the amount of change, by looking at the value of the optical flow calculated at step S8040. Specifically, the control portion 1005 determines the amount of change to be large if the value of the optical flow is above a threshold value, and to be small if the value of the optical flow is at or below the threshold value. If the amount of change in small, the processing advances to step S8060, and if the amount of change in large, the processing advances to step S8070.

In step S8060, the control portion 1005 determines whether the process of initializing the position and orientation of the image capturing apparatus 110 has ended. If the initialization process has ended, the control portion 1005 determines whether the initialization process was successful or not. If the initialization process was successful, the flag F is set to indicate successful, and if the initialization process failed, the flag F is set to indicate failed. The set value of the flag F is then stored in the data storage portion 1050, and the processing advances to step S8130. Also, if the initialization process has not ended, j=j+1 is set, and the processing returns to step S8040.

In step S8070, the position and orientation initialization portion 1030 cancels the initialization process, sets the flag F to indicate failed, stores the set value of the flag F in the data storage portion 1050, and advances to step S8130.

In step S8080, the image selection portion 1020 selects the image Pk and the image Pk+1 of the kth and k+1th frames, when the image with the highest frame number out of the images used in steps S8030, S8100 and S8110 is the image of the kth frame.

At step S8090, the control portion 1005 determines whether the image Pk+1 selected in step S8080 is the latest image. If the image Pk+1 is the latest image, the processing advances to step S8110, and if the image Pk+1 is not the latest image, the processing advances to step S8100.

In step S8100, the optical flow calculation portion 7010 calculates the value of the optical flow from the images Pk and Pk+1, and determines whether a change in the value of the optical flow has been detected. Specifically, the optical flow calculation portion 7010, which serves as an optical flow determination unit, determines that a change has been detected if the value of the optical flow is above a prescribed threshold value, and that a change has not been detected if the value of the optical flow is at or below the threshold value. If a change in optical flow has been detected, the processing advances to step S8110, and if a change in optical flow has not been detected, the processing returns to step S8080.

In step S8110, the position and orientation calculation portion 1040 calculates the position and orientation of the image capturing apparatus 110 with the position and orientation calculation method using edges disclosed in Non-Patent Document 1, using the image Pk+1.

When step S8110 ends, the processing advances to step 8120, and failure detection is performed. Here, the control portion 1005 detects whether the position and orientation measurement has failed. If failure is detected in step S8120, the control portion 1005 sets the flag F to indicate failed, and stores the set value of the flag F in the data storage portion 1050. When step S8120 ends, the processing advances to step S8130.

At step S8130, the control portion 1005 checks the processing status of image data stored in the data storage portion 1050, and determines whether to end the position and orientation measurement. In the case of not ending the position and orientation measurement, the processing returns to step S8010.

Embodiment 5

In the embodiments 1-4, the method of acquiring the orientation of the camera position is utilized for initialization by matching the three-dimensional edge model to the edge detected on the image. However, this invention is not limited by the method using the edge for initialization. For example, the initial position and orientation may be determined by using a SIFT feature quantity as shown in Non-Patent Document 3. In this embodiment, the method of acquiring the initial position and orientation of camera using the SIFT feature quantity as shown in Non-Patent Document 3 is described.

Structure

Figure 10:
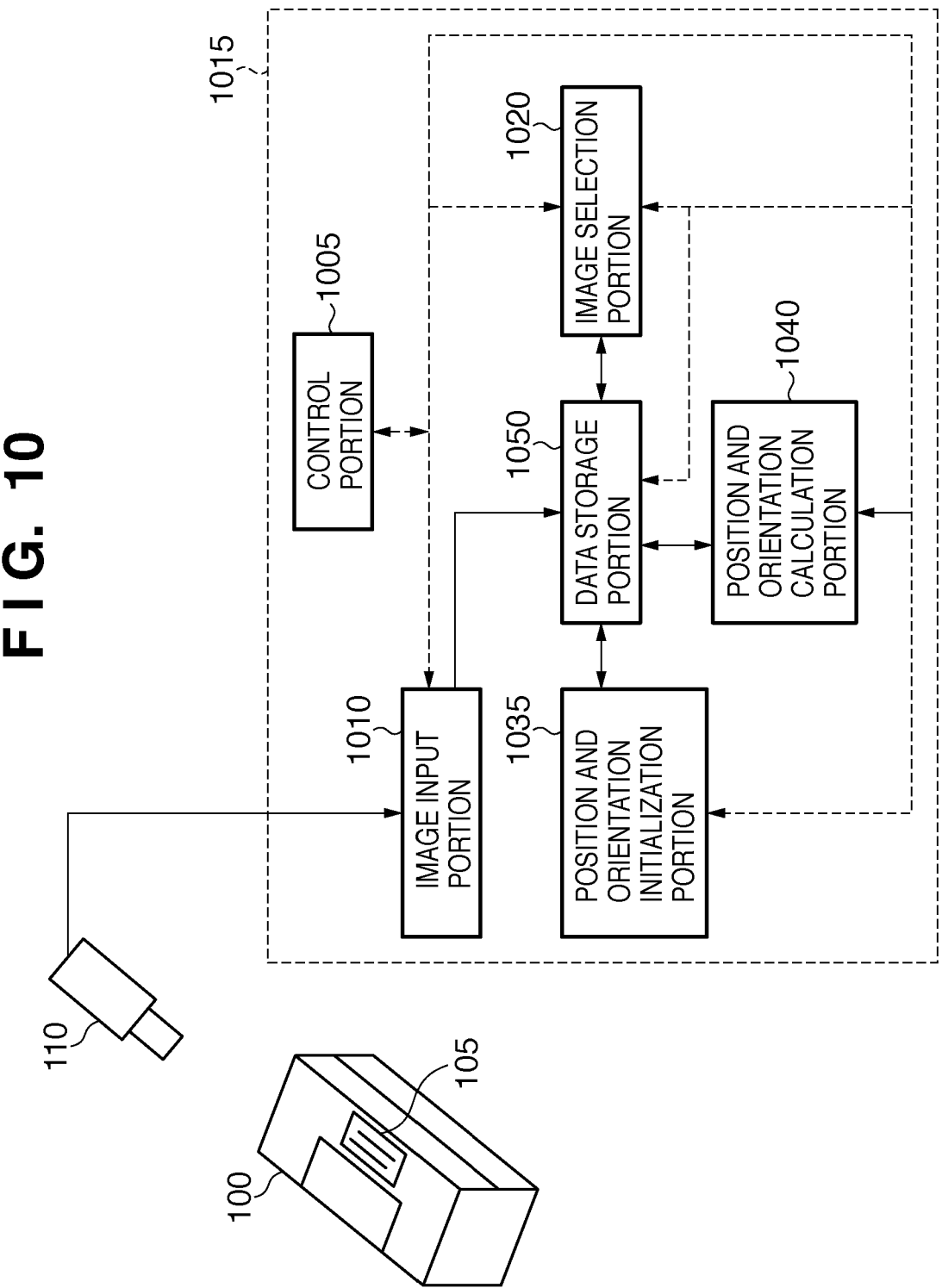
FIG. 10 is a block diagram showing a structure of a position and orientation measurement unit in embodiment 5.

FIG. 10 shows a block diagram of a structure of a position and orientation measurement unit in embodiment 5. In FIG. 10, the same identification number is put on the same elements as the elements in FIG. 1. Therefore, the explanation for the same elements is omitted. As shown in FIG. 10, the position and orientation measurement unit 1015 in this embodiment is comprised of the image input portion 1010, the position and orientation calculation portion 1040, the data storage portion 1050 and position and orientation initialization portion 1035. The position and orientation measurement unit 1015 includes control portion 1005 and control these structured elements across the board.

The label 105 indicates a printed seal stuck on the observation target object 100. It is assumed that characters of notes are written on the label 105. However, the content of the label is not limited by characters, but the label may be used if it has some patterns to be utilized as image features. The label 105 is matched to the pre-calculated SIFT feature database based on an image of the label 105 captured by the image capturing apparatus 110, and is used for calculating the initial position and orientation of the image capturing apparatus 110.

For example, in the position and orientation initialization portion 1035, a method of estimating a position and orientation using a SIFT feature quantity described in Non-Patent Document 3 may be used. The SIFT feature quantity is non-variable feature quantity corresponding to rotation and scale change on the image within the object region when the image capturing apparatus is moved. Thus, even if the image capturing apparatus is moved, this is the feature quantity to enable to distinguish a pre-registered body and to measure a position and orientation of the body. For example, the label 105 is pre-registered as a SIFT feature quantity, and further a database corresponding to of the SIFT feature quantity in three dimensional space. Then, the label 105 is captured by the image capturing apparatus 110 and the SIFT feature quantity is calculated. At this time, the calculated feature quantity is checked off the database and matched to it. The plurality of the SIFT feature quantities are successfully matched to the database, it becomes possible to estimate the position and orientation of the image capturing apparatus 110.

Flowchart

Next, the procedure of the method of position and orientation measurement in this embodiment is described.

Figure 11:
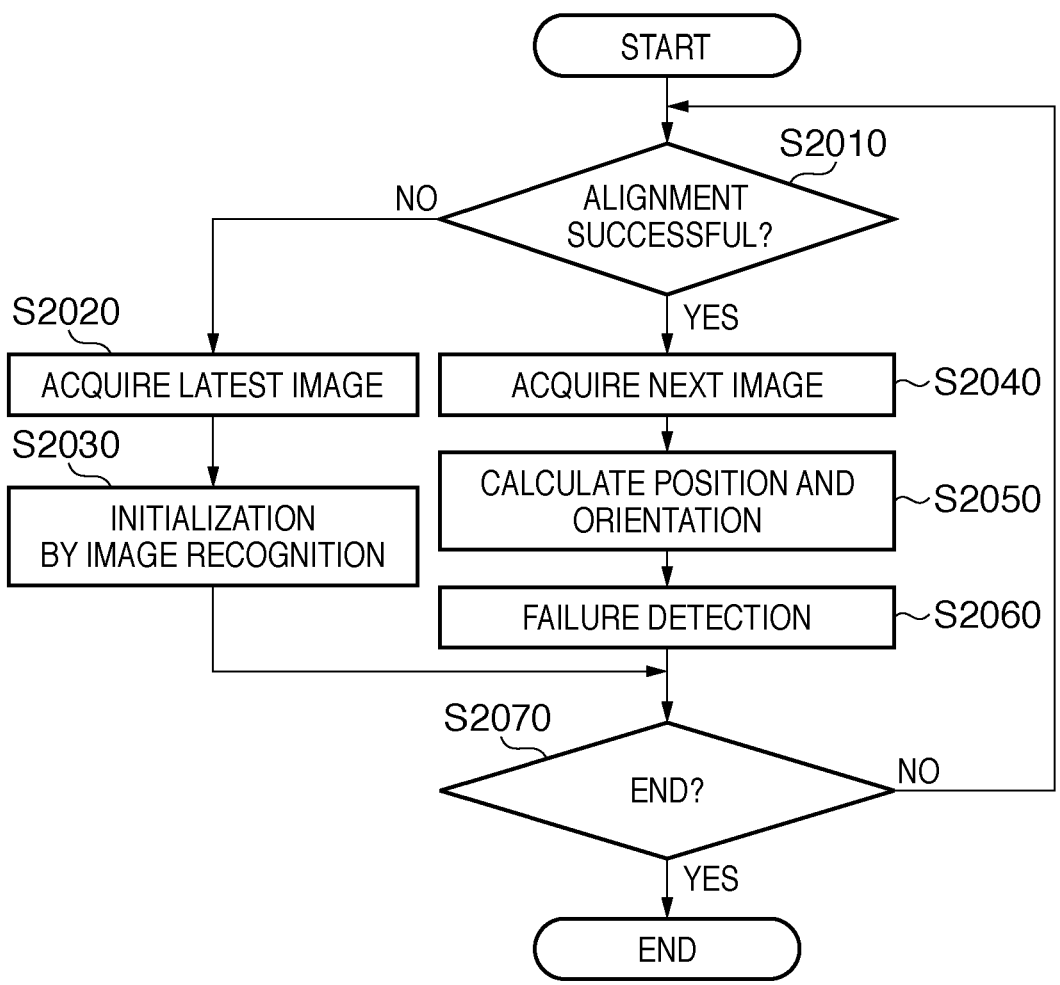
FIG. 11 is a flowchart showing a method of a position and orientation measurement unit in embodiment 5.

FIG. 11 shows a flowchart for the procedure of the method of position and orientation measurement in this embodiment. The same indication number is used for the same steps as the steps in FIG. 2. Therefore, the explanation for the same steps is omitted.

In steps 2035, the position and orientation are initialized in the position and orientation portion 1035 of the image capturing apparatus 110. If the initialization is successful, the flag F is set to success. If the initialization is failed, the flag F is set to failure. Then the content of the flag F is stored in data storage portion 1050. In this embodiment, the initial position and orientation of the image capturing apparatus 110 is calculated by the image recognition with the SIFT feature quantity. As described above, this invention is not dependent on the method of the initialization. Thus, if any process determines the initial position and orientation of the image capturing apparatus, that process can be applied to this invention.

In the embodiments 1-4, the method of measuring the position and orientation of the image capturing apparatus using an edge, described in Non-Patent document 1 is utilized in the position and orientation calculation portion 1040. However, this invention is not limited by using the edge for a calculating process for the position and orientation. For example, the position and orientation of the image capturing apparatus may be determined by tracking feature quantities detected by a FAST (Features from Accelerated Segment Test) detector.

The FAST is a detector which detects feature points of the of the object such as poster or window placed on the scene as a image feature. In this embodiment, it is explained the case that the FAST detector is utilized for the position and orientation of the image capturing apparatus.

Structure

The structure of the position and orientation measurement unit in this embodiment contains a position and orientation calculation portion by modifying the position and orientation calculation portion 1040 in FIG. 10 so as to calculate a position and orientation using the FAST.

First, the image capturing apparatus 110 captures the observation target object 100. Next, an initial position and orientation the position and orientation initialization portion 1030 is estimated using the SIFT feature quantities acquired from the captured image exemplified in the embodiment 5 in the position and orientation initialization portion 1030.

The feature points (edge points of the image) is further extracted from the captured image in the position and orientation calculation portion 1040. In this embodiment, for example, a FAST (Features from Accelerated Segment Test) detector described in Non-Patent Document 4 is used. Thus, the feature points are extracted by comparing an intensity value of pixels on a fixed radius centered at an interest point to an intensity value at the interest point. Here, in the position and orientation calculation portion 1040, a feature point detected in an image of the former frame and a feature point detected in an image of the latest frame are matched.

In the position and orientation calculation portion 1040, regarding the matched feature point, the three dimensional position of the feature point which is predetermined on the same scene can be further related to the feature point detected on the image. Then, using the related plurality of feature points, the position and orientation of the image capture apparatus is acquired. For example, the position and orientation of a camera may be calculated using the feature point on the image which is randomly related to the feature point in the three dimensional space, and the final position and orientation of the camera is output as the result of calculation when the highest matching is achieved.

Flowchart

Next, the procedure for the method of position and orientation measurement is explained. The procedure for the method of the position and orientation measurement unit in this embodiment contains a position and orientation calculation step by modifying the position and orientation calculation step S2050 in FIG. 11 so as to calculate a position and orientation using the FAST.

In step S2050, the position and orientation of the image capturing apparatus 110 is calculated by using the selected image P k+α in step S 2040. As described before, this step is the step for calculating the position and orientation of the image capturing apparatus 110 by matching the feature point detected with the FAST detector to the three dimensional position of the pre-registered feature point.

As described above, this invention is not dependent on the method of the position and orientation calculation. Thus, if any method acquires the position and orientation of the image capturing apparatus, that method can be applied to this invention.

Embodiment 7

The constituent elements of the position and orientation measurement unit shown in Embodiments 1 through 6 were all described as being constituted by hardware. However, some may be constituted by software. In this case, by causing a computer in which the remaining constituent elements are implemented as hardware to execute this software, this computer performs the operations of an image processing apparatus as described in the above embodiments.

Configuration

Figure 9:
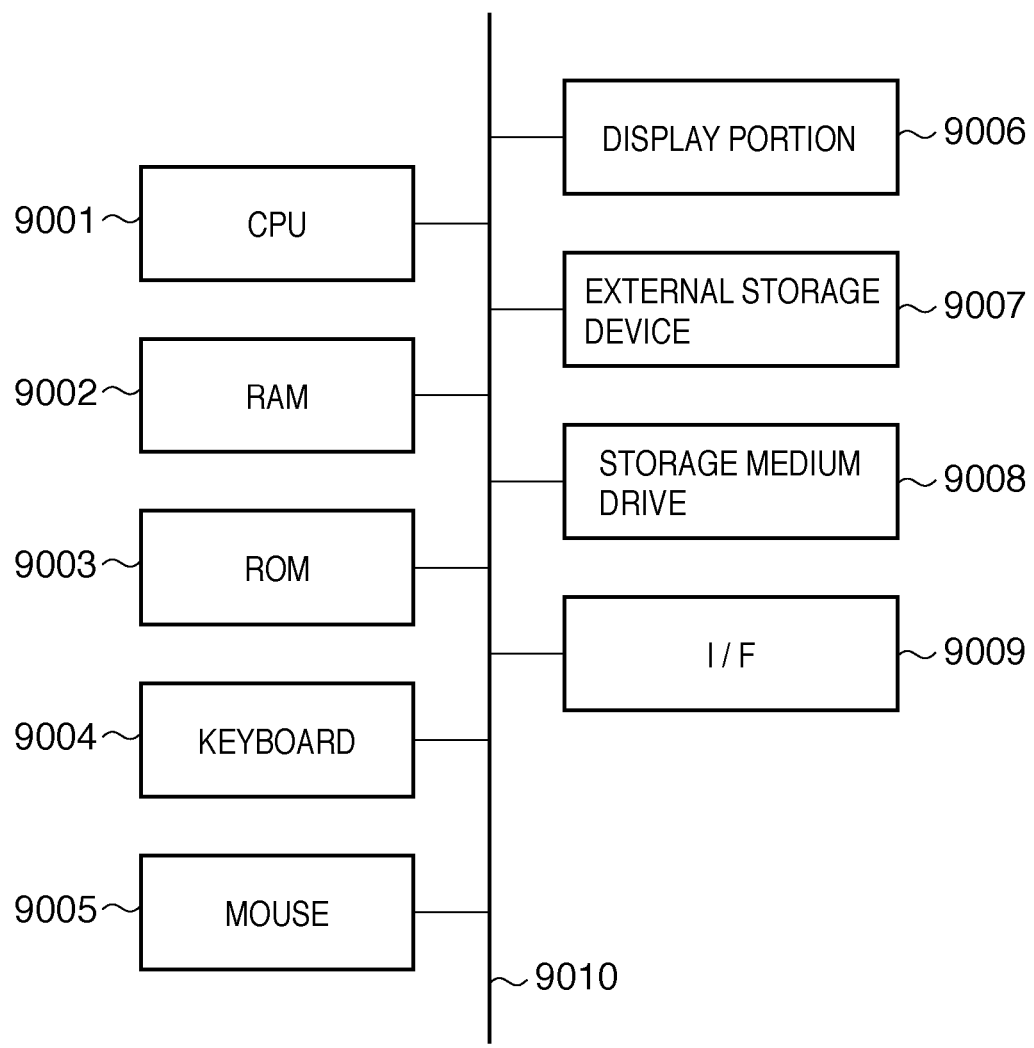
FIG. 9 is a block diagram showing a basic configuration of a computer that uses software to realize constituent elements of an information processing apparatus.

FIG. 9 is a block diagram showing an example hardware configuration of a computer applicable to a position and orientation measurement unit.

A CPU 9001 performs overall control of the computer using computer programs and data stored in a RAM 9002 and a ROM 9003. Also, the CPU additionally executes the above-mentioned processes described as being performed by a position and orientation measurement unit in the above embodiments.

The RAM 9002 is a storage medium having an area for temporarily storing computer programs and data loaded from an external storage device 9007 or a storage medium drive 9008. Also, the RAM 9002 has an area for temporarily storing data received externally via an I/F (interface) 9009. Further, the RAM 9002 also has a work area that is used when the CPU 9001 executes various processes. That is, the RAM 9002 is able to appropriately provide various types of areas. For example, the RAM 9002 also functions as the data storage portion 1050 shown in FIG. 1.

Also, the ROM 9003 stores a boot program and setting data of the computer.

A keyboard 9004 and a mouse 9005 are examples of operation input devices, and are able to input various types of instructions to the CPU 9001 as a result of being operated by a user of the computer.

A display portion 9006 is constituted by a CRT, a liquid crystal display or the like, and is able to display the results of processing by the CPU 9001 using images, characters and the like. For example, messages and the like to be displayed in order to perform position and orientation measurement of the image capturing apparatus 110 can be displayed on the display portion 9006.

The external storage device 9007 is a mass information storage device typified by a hard disk drive. The external storage device 9007 stores an OS (operating system), and programs and data for causing the CPU 9001 to execute the abovementioned processes described as being performed by a position and orientation measurement unit. In the case of FIG. 1, computer programs according thereto include functions corresponding respectively to the image input portion 1010, the image selection portion 1020, the position and orientation initialization portion 1030, and the position and orientation calculation portion 1040. Also, this data includes virtual space data and data described above as known information.

The computer programs and data saved in the external storage device 9007 are appropriately loaded into the RAM 9002 in accordance with the control of the CPU 9001. The CPU 9001, by executing processing using these loaded programs and data, executes the processes discussed above as being performed by a position and orientation measurement unit. Note that the external storage device 9007 may be used as the data storage portion 1050 shown in FIG. 1.

The storage medium drive 9008 reads out programs and data stored in storage media such as a CD-ROM or a DVD-ROM, and writes computer programs and data to such storage media. Note that some or all of the programs and data described as being saved in the external storage device 9007 may be recorded to such storage media. Computer programs and data read out from a storage medium by the storage medium drive 9008 are output to the external storage device 9007 or the RAM 9002.

The I/F 9009 is constituted by an analog video port for connecting the image capturing apparatus 110, or a digital input port such as an IEEE 1394 port. Also, the I/F 9009 may be constituted by an Ethernet port or the like for outputting calculated position and orientation information on the image capturing apparatus. Data received via the I/F 9009 is input to the RAM 9002 or the external storage device 9007. Note that some of the functions of the image input portion 1010 shown in FIG. 1 are realized by the I/F 9009. Also, in the case where a sensor system is used, the sensor system will be connected to this the I/F 9009. A bus 9010 links the abovementioned constituent elements using bus signals.

Other Embodiments

Aspects of the present invention can also be realized by a computer of a system or apparatus (or devices such as a CPU or MPU) that reads out and executes a program recorded on a memory apparatus to perform the functions of the above-described embodiments, and by a method, the steps of which are performed by a computer of a system or apparatus by, for example, reading out and executing a program recorded on a memory apparatus to perform the functions of the above-described embodiments. For this purpose, the program is provided to the computer for example via a network or from a recording medium of various types serving as the memory apparatus (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-111497, filed Apr. 30, 2009 and 2010-091828, filed Apr. 12, 2010, which are hereby incorporated by reference herein in their entirety.

What is claimed is:

1. An information processing apparatus comprising:
   an input unit configured to sequentially acquire a first plurality of frame images from an image capturing apparatus for capturing a target object;
   a storage unit configured to store the first plurality of frame images acquired by the input unit;
   a measurement unit configured to select a first frame image from the first plurality of frame images, and configured to measure the position and orientation of the image capturing apparatus, when the image capturing apparatus has captured frame images which follow the first frame image, based on the first frame image;
   a first determination unit configured to determine whether a value of the position and orientation of the image capturing apparatus measured by the measurement unit is within a prescribed range;
   a second determination unit configured to determine whether a second plurality of frame images from the first plurality of frame images are stored in the storage unit between the first frame image and a frame image for which the value of the position and orientation of the image capturing apparatus is determined not to be within the prescribed range; and
   a control unit configured to perform control such that the measurement unit measures the position and orientation of the image capturing apparatus using a second frame image that is separated by a preset number of frames from the first frame image, in a case where the second determination unit determines that the second plurality of frame images are stored in the storage unit.

2. The information processing apparatus according to claim 1, wherein the measurement unit selects frame images that follow the designated frame image from the first plurality of stored frame images, uses a frame image precedent to the selected frame image and the currently selected frame image to calculate a change in optical flow, and matches the feature of the target object in the preceding frame image to the feature of the target image in the currently selected frame image if a calculated value of the optical flow is greater than or equal to a prescribed threshold value, and measures the position and orientation of the image capturing apparatus.

3. The information processing apparatus according to claim 1, wherein the measurement unit measures the position and orientation of the image capturing apparatus by matching the feature of the target object in a frame image precedent to the selected frame image to the feature of the target object in the first frame image.

4. The apparatus according to claim 3, wherein the feature of the target object is a line segment.

5. The apparatus according to claim 3, wherein the feature of the target object is a feature point.

6. The information processing apparatus according to claim 1, wherein the second frame image is selected every preset number of frames, from the first plurality of frame images stored in the storage unit.

7. The information processing apparatus according to claim 6, wherein the preset number of frames is determined based on a value of a frame rate of the frame images.

8. The apparatus according to claim 1, wherein the image capturing apparatus is attached on a head mount display.

9. A control method of an information processing apparatus, comprising:
   an input step of acquiring sequentially a first plurality of frame images from an image capturing apparatus for capturing a target object;
   a storage step of storing the first plurality of frame images acquired in the input step;
   a measurement step of (i) selecting a first frame image from the first plurality of frame images, and (ii) measuring the position and orientation of the image capturing apparatus, when the image capturing apparatus has captured frame images which follow the first frame image, based on the first frame image;
   a first determination step of determining whether a value of the position and orientation of the image capturing apparatus measured in the measurement step is within a prescribed range;
   a second determination step of determining whether a second plurality of frame images from the first plurality of frame images are stored in the storage unit between the first frame image and a frame image for which the value of the position and orientation of the image capturing apparatus is determined not to be within the prescribed range;

a control step of performing control to measure the position and orientation of the image capturing apparatus using a second frame image that is separated by a preset number of frames from the first frame image, in a case where it is determined in the second determination step that the second plurality of frame images are stored in the storage unit.

10. A non-transitory computer readable storage medium which stores a computer program for causing a computer to execute the control method of an information processing apparatus according to claim 9.

* * * * *